(12) United States Patent
Mizumura

(10) Patent No.: US 7,756,406 B2
(45) Date of Patent: Jul. 13, 2010

(54) PHOTOGRAPHIC APPARATUS AND INTERCHANGEABLE CAMERA LENS

(75) Inventor: Hiroshi Mizumura, Saitama (JP)

(73) Assignee: Fujinon Corporation, Saitama (JP)

( * ) Notice: Subject to any disclaimer, the term of this patent is extended or adjusted under 35 U.S.C. 154(b) by 814 days.

(21) Appl. No.: 11/210,815

(22) Filed: Aug. 25, 2005

(65) Prior Publication Data

US 2006/0045500 A1    Mar. 2, 2006

(30) Foreign Application Priority Data

Aug. 27, 2004    (JP)    ............ P. 2004-248556

(51) Int. Cl.
G03B 17/00    (2006.01)
H04N 5/228    (2006.01)
G02B 27/64    (2006.01)

(52) U.S. Cl. .............. 396/55; 396/53; 348/208.1; 348/208.2; 348/208.11; 359/557

(58) Field of Classification Search .............. 396/55, 396/52, 53, 54; 382/255, 264; 348/208.99, 348/208.1, 208.2, 208.11; 359/554–557
See application file for complete search history.

(56) References Cited

U.S. PATENT DOCUMENTS

| 4,774,538 A | * | 9/1988 | Kawai ............ 396/53 |
| 5,117,246 A | * | 5/1992 | Takahashi et al. ............ 396/55 |
| 5,153,633 A | | 10/1992 | Otani |
| 5,218,442 A | * | 6/1993 | Hamada et al. ........ 348/208.15 |
| 5,220,375 A | * | 6/1993 | Ishida et al. ............ 396/55 |
| 5,537,185 A | * | 7/1996 | Ohishi et al. ............ 396/55 |
| 5,615,397 A | * | 3/1997 | Shiomi et al. ............ 396/55 |
| 6,088,533 A | * | 7/2000 | Shiomi ............ 396/52 |
| 6,208,810 B1 | | 3/2001 | Imada |
| 2001/0043809 A1 | * | 11/2001 | Sato et al. ............ 396/52 |

FOREIGN PATENT DOCUMENTS

| EP | 1 122 581 A2 | 8/2001 |
| EP | 1610174 | 12/2005 |
| JP | 8-101418 | 4/1996 |
| JP | 09-051466 | 2/1997 |
| JP | 11-15035 (A) | 1/1999 |
| JP | 2002-229089 | 8/2002 |
| JP | 2004-170601 | 6/2004 |

OTHER PUBLICATIONS

European Search Report issued on Dec. 21, 2005.
European Office Action dated Jan. 25, 2008.

* cited by examiner

*Primary Examiner*—Rochelle-Ann J Blackman
(74) *Attorney, Agent, or Firm*—Harness, Dickey & Pierce, PLC

(57) ABSTRACT

A photographic apparatus is provided and has a camera, an interchangeable camera lens, and a lens control unit. The camera unit has a blur signal-outputting unit and a camera control unit. The interchangeable camera lens has an image-displacing unit and a blur correcting unit. When a change in the state of an optical system of the interchangeable camera lens is recognized, the lens control unit generates blur correction process-information based on the state of the optical system after the change and transmits the blur correction process-information to a camera control unit.

5 Claims, 4 Drawing Sheets

PHOTOGRAPHIC APPARATUS AND INTERCHANGEABLE CAMERA LENS

FIELD OF THE INVENTION

The present invention relates to a photographic apparatus and an interchangeable camera lens and, more particularly, to a photographic apparatus and an interchangeable camera lens having a function of correcting (preventing) a blur on an image resulting from a vibration.

BACKGROUND OF THE INVENTION

Techniques for correcting a blur on an image resulting from a vibration of a camera have been developed. For example, JP-A-8-101418 discloses a blur preventing device that prevents a blur on an image by connecting an output from a blur detecting unit for detecting a blur to a blur correcting unit according to an operation of a release operation member of the camera so as to operate the blur preventing unit. As an example of a camera whose lens can be changed, JP-A-2004-170601 discloses an interchangeable camera lens having a blur correcting function.

In general, all processes associated with correction (prevention) of a blur on an image are performed by a single controller (a microcomputer) in a camera or interchangeable camera lens as described above. When a vibration applied to a camera is detected, such a microcomputer performing blur correcting processes has performed a process of discriminating a vibration to be corrected from a vibration resulting from an intentional operation of the photographer (e.g., tilting or panning). Specifically, since an angle through which the blur correcting optical system can correct a blur on an image (a maximum correcting angle) depends on the type and setting of the lens used, the microcomputer of the camera or interchangeable camera lens determines whether a vibration is to be corrected or not based on the maximum correcting angle. It has been possible to perform photographing in an optimum way depending on the type of the lens used by discriminating vibrations as described above.

Some interchangeable camera lenses employ a configuration in which a microcomputer of a camera processes angle information and in which a microcomputer of a lens receives the angle information from the microcomputer of the camera and drives an optical system for correcting a blur on an image. In this case, in order to discriminate a vibration to be corrected from a vibration resulting from an intentional operation of the photographer based on the maximum correcting angle of the interchangeable camera lens, information on blur correction such as the maximum correcting angle of the lens must be shared between the microcomputer of the camera and the microcomputer of the lens.

SUMMARY OF THE INVENTION

An object of an illustrative, non-limiting embodiment of the invention is to provide a photographic apparatus in which a microcomputer at a camera processes information on an angle of a vibration and in which a microcomputer at a lens drives an optical system for correcting a blur on an image based on the angle information from the camera, the photographic apparatus being capable of discriminating a vibration to be corrected being from a vibration resulting from an intentional operation of the photographer and capable of performing optimum blur correction. Another object of an illustrative, non-limiting embodiment of the invention is to provide an interchangeable camera lens mounted on the photographic apparatus.

In order to achieve the above-described objects, the invention provides the following means.

(1) A photographic apparatus including a camera, an interchangeable camera lens whose optical system is partially or entirely interchangeable, and a lens control unit that controls the interchangeable camera lens, characterized in that:

the camera includes a blur signal-outputting unit that outputs a blur signal associated with a vibration applied to the interchangeable camera lens, and the camera includes a camera control unit that controls the camera;

the interchangeable camera lens includes an image-displacing unit that displaces an image and a blur correcting unit that controls the image-displacing unit based on the blur signal output from the blur signal-outputting unit so that the image-displacing unit displaces the image so as to cancel a blur of the image, the blur resulting from the vibration applied to the interchangeable camera lens; and the lens control unit obtains information on blur correction at the interchangeable camera lens according to a state of the interchangeable camera lens and transmits the information on blur correction to the camera control means.

According to the photographic apparatus of the item (1), in the photographic apparatus in which the detection of a vibration and processing of angle information is performed at the camera and in which an image displacing process for correcting a blur on an image is performed at the lens, information on blur correction can be shared by control units at the camera and the lens.

(2) A photographic apparatus according to the item (1), characterized in that the lens control unit obtains the information on blur correction and transmits the information to the camera control unit when a power supply of the photographic apparatus is turned on, when the interchangeable camera lens is mounted on the camera, or when the state of the interchangeable camera lens is changed.

In the photographic apparatus according to the item (2), an optimum blur correction process can be performed because the information on blur correction is transmitted to the camera each time the interchangeable camera lens is recognized by the camera when the power supply is turned on or each time the state of the interchangeable camera lens is changed.

(3) A photographic apparatus according to the item (1) or (2), characterized in that the information on blur correction includes information on a maximum correction angle at the time of blur correction at the interchangeable camera lens and that the camera control unit controls the lens control means such that no blur correction is performed when an angle of the vibration applied to the interchangeable camera lens is greater than the maximum correcting angle.

In the photographic apparatus according to the item (3), when a vibration applied to the optical system is detected, a process of discriminating a vibration to be corrected from a vibration resulting from an intentional operation (e.g., tilting or panning) of the photographer can be performed based on the maximum correcting angle of the interchangeable camera lens transmitted to the camera to allow an optimum blur correcting process.

(4) An interchangeable camera lens mounted on a photographic apparatus including: the interchangeable camera lens whose optical system is partially or entirely interchangeable; and a camera having a blur signal-outputting unit that outputs a blur signal associated with a vibration applied to the interchangeable camera lens and a camera control unit that controls the camera, characterized in that it includes:

an image displacing unit that displaces an image;

a blur correcting unit that controls the image-displacing unit based on the blur signal output from the blur signal-outputting unit so that the image-displacing unit displaces the image so as to cancel a blur of the image, the blur resulting from the vibration applied to the interchangeable camera lens; and a lens control unit that controls the interchangeable camera lens, the lens control unit obtaining information on blur correction at the interchangeable camera lens according to a state of the interchangeable camera lens and transmitting the information on blur correction to the camera control unit.

According to the invention, in a photographic apparatus in which the detection of a vibration and processing of angle information is performed at a camera and in which an image displacing process for correcting a blur on an image is performed at a lens, information on blur correction at an interchangeable camera lens can be transmitted to the camera in advance. Thus, when a vibration is detected, a process of discriminating a vibration to be corrected from a vibration resulting from an intentional operation (e.g., tilting or panning) of the photographer can be performed to allow an optimum blur correction process.

DETAILED DESCRIPTION OF THE INVENTION

An exemplary embodiment of a photographic apparatus and an interchangeable camera lens according to the invention will now be described with reference to the accompanying drawings.

Figure 1:
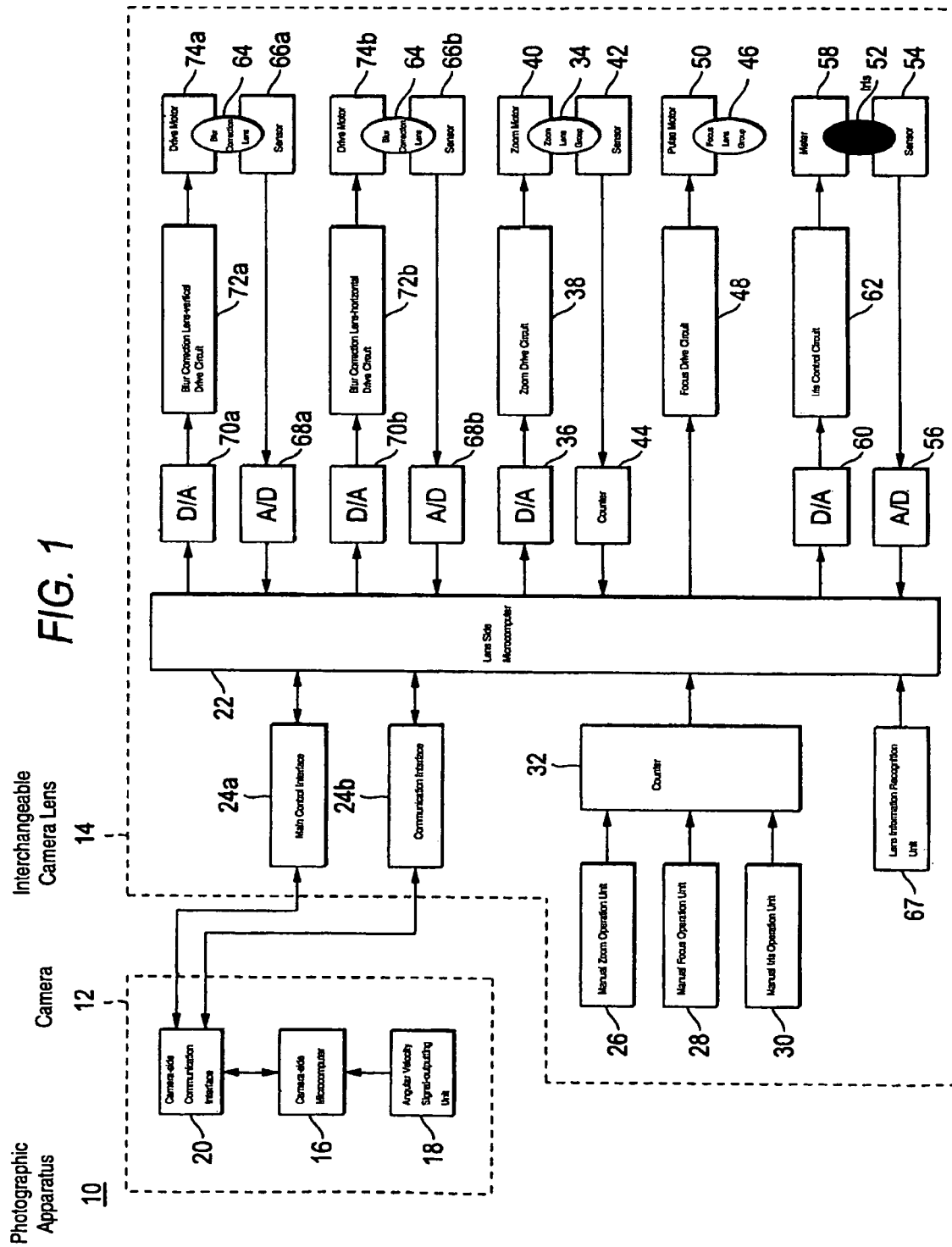
FIG. 1 is a block diagram of a photographic apparatus according to an illustrative, non-limiting embodiment of the invention.

FIG. 1 is a block diagram of a photographic apparatus according to an exemplary embodiment of the invention. As shown in FIG. 1, a photographic apparatus 10 includes a camera 12 and an interchangeable camera lens 14.

The camera 12 includes a camera-side microcomputer 16, an angular velocity signal-outputting unit 18, and a camera-side communication interface 20.

The camera-side microcomputer 16 serves as a camera control unit. The camera-side microcomputer 16 includes a ROM in which control programs and various data tables required for control and calculations are stored and a RAM which is used as a working storage region, and the computer controls each device in the camera 12 according to programs.

The angular velocity signal-outputting unit 18 serves as a blur signal-outputting unit. The angular velocity signal-outputting unit 18 includes an angular velocity sensor for detecting vertical and horizontal angular velocities of a vibration applied to the photographic apparatus 10, and the unit is configured to output signals indicating the angular velocities detected by the angular velocity sensor (angular velocity signals, i.e., blur signals).

The camera-side communication interface 20 is a device for communication with the interchangeable camera lens 14.

The interchangeable camera lens 14 includes a lens-side microcomputer 22, a main control interface 24a, and a communication interface 24b for blur correction.

The lens-side microcomputer 22 serves as a lens control unit. The lens-side microcomputer 22 includes a ROM in which control programs and various data tables required for control and calculations are stored and a RAM which is used as a working storage region, and the computer controls each device in the interchangeable camera lens 14 according to programs.

The camera-side microcomputer 16 and the lens-side microcomputer 22 are serially connected through the main communication interface 24a and the blur correction communication interface 24b of the interchangeable camera lens 14. The main communication interface 24a is a device for communication of data on the zoom, focus (AF and MF), and iris (diaphragm) of the interchangeable camera lens 14, and the blur correction communication interface 24b is a device for receiving vibration angle information transmitted by the camera-side microcomputer 16.

A description will now be made on mechanisms for processes associated with the zoom, focus, and iris of the interchangeable camera lens 14. A manual zoom operation unit 26 shown in FIG. 1 is, for example, a zoom ring which is rotatably provided at an outer circumferential part of the interchangeable camera lens 14. The direction and amount of a rotation of the zoom ring is converted by a counter 32 into zoom demand data instructing a speed at which a group 34 of zoom lenses is to be moved, and the data is output to the lens-side microcomputer 22. Based on the zoom demand data, the lens-side microcomputer 22 outputs a control signal to a zoom drive circuit 38 through a D-A converter 36. The zoom drive circuit 38 controls a zoom motor 40 based on the control signal to drive the zoom lens group 34 of the interchangeable camera lens 14. The lens-side microcomputer 22 calculates the amount the zoom lens group 34 is to be moved based on the zoom demand data fetched from the counter 32 and position data of the zoom lens group 34 input from a sensor 42 through a counter 44.

A manual focus operation unit 28 is, for example, a focus knob which is provided on the outer circumference of the interchangeable camera lens 14. The amount of a rotating operation on the focus knob is converted by the counter 32 into focus demand data instructing a position to which a group 46 of focus lenses is to be moved, and the data is output to the lens-side microcomputer 22. The lens-side microcomputer 22 outputs a control signal to a focus drive circuit 48 based on the focus demand data. The focus drive circuit 48 controls a pulse motor 50 based on the control signal to drive the focus lens group 46.

Further, the lens-side microcomputer 22 calculates an amount by which a meter 58 is to be driven based on stop value data input from a sensor 54 for an iris (diaphragm) 52 through an A-D converter 56 and an iris control signal input from a manual iris operation unit 30 through the counter 32, and the computer outputs a control signal for the meter 58 to an iris control circuit 62 through a D-A converter 60. The amount the meter 58 is to be driven may alternatively be calculated by the iris control circuit 62 by inputting the stop value data obtained by the sensor 54 for the iris 52 to the iris control circuit 62.

A blur correction mechanism of the photographic apparatus 10 of the present embodiment will now be described. A lens information-recognition unit 67 shown in FIG. 1 is a device for recognizing information on the state of the interchangeable camera lens 14 and inputting the information to the lens-side microcomputer 22. For example, the information on the state of the interchangeable camera lens 14 is zoom information and information on an optical system (a comparator lens or extender) connected to the interchangeable camera lens 14.

Based on the information on the state of the interchangeable camera lens 14, the lens-side microcomputer 22 processes information on blur correction at the interchangeable camera lens 14 (i.e., blur correction process-information) and transmits the information to the camera-side microcomputer 16 in advance.

When a vibration is applied to the photographic apparatus 10, an angular velocity signal is output by the angle signal-outputting unit 18 of the camera 12 shown in FIG. 1. The angular velocity signal is supplied to a low-pass filter (LPF), which is not shown, to cut off frequency components thereof higher than a frequency range for which a blur on an image is to be corrected. The signal is thereafter converted by an A-D converter into a digital signal which is then input to the camera-side microcomputer 16.

The camera-side microcomputer 16 integrates the input angular velocity signal by performing an arithmetic process similar to that in a digital filter to convert the angular velocity signal into an angle signal. Specifically, the angular velocity signal is integrated to identify the amount by which a blur correction lens 64 (a blur correcting unit) is to be displaced (the amount of displacement from a reference position) to displace an image in such a direction and magnitude that a blur on the image attributable to the vibration of the optical system will be canceled. The angle signal is processed by the camera-side microcomputer 16 based on the blur correction process information transmitted by the lens-side microcomputer 22. The angle signal is output as a value indicating a target position to which the blur correction lens 64 is to be moved, and the signal is input to the lens-side microcomputer 22 through the blur correction communication interface 24b.

Next, the vertical and horizontal positions of the blur correction lens 64 are detected by sensors 66a and 66b, respectively, and are input to the lens-side microcomputer 22 through A-D converters 68a and 68b. The lens-side microcomputer 22 calculates amounts by which the blur correction lens 64 is to be moved in the vertical and horizontal directions based on the position of the blur correction lens 64 and the target position to which the lens is to be moved.

The calculated amounts by which the blur correction lens 64 is to be moved are converted by D-A converters 70a and 70b into analog signals which are then input to a blur correction lens-vertical drive circuit 72a and a blur correction lens-horizontal drive circuit 72b, respectively. The blur correction lens-vertical drive circuit 72a and the blur correction lens-horizontal drive circuit 72b drive motors 74a and 74b for moving the blur correction lens 64 in the vertical and horizontal directions, respectively, thereby moving the blur correction lens 64 based on the values of movement of the blur correction lens 64 output by the lens-side microcomputer 22. Thus, the blur on an image resulting from the vibration applied to the photographic apparatus 10 is corrected (cancelled).

The present embodiment has been described with reference to a case in which a vibration applied to an optical system is detected by an angular velocity sensor to correct a blur on an image based on an angular velocity signal output by the angular velocity sensor. Alternatively, the vibration applied to the optical system may be detected by a blur sensor, e.g., an angular acceleration sensor, acceleration sensor, speed sensor, angular displacement sensor, or displacement sensor, other than the angular velocity sensor, and the blur may be corrected based on a blur signal output by the blur sensor in association with the vibration.

According to the method of correcting a blur on an image in the present embodiment, an image on the optical system is intentionally displaced by displacing the blur correction lens 64. However, the invention is not limited to the method, and a blur on an image may be cancelled by changing the optical path of the object light with an optical element such as a prism.

Figure 2:
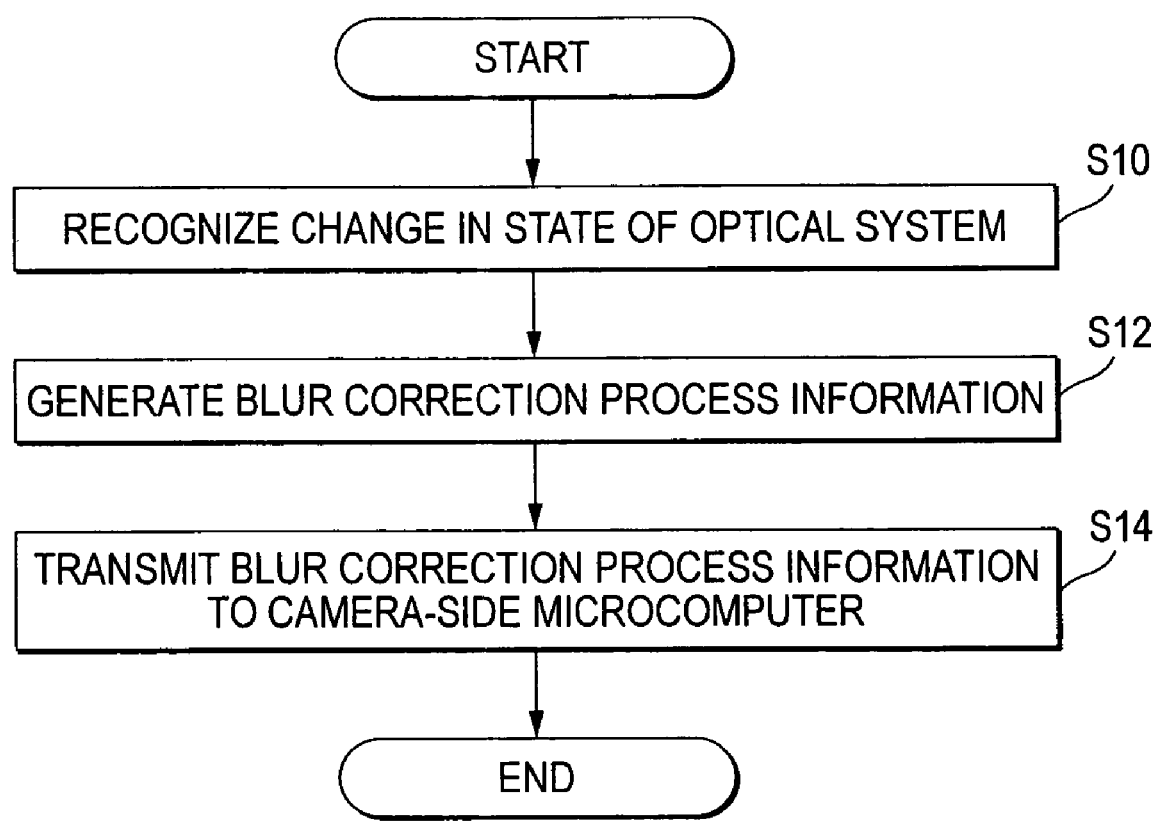
FIG. 2 is an exemplary flow chart showing steps for transmitting blur correction process information to a camera-side microcomputer 16.

The blur correcting method of the present embodiment will now be described. FIG. 2 is a flow chart showing steps for transmitting blur correction process information to the camera-side microcomputer 16.

First, when the state of the optical system of the interchangeable camera lens 14 is changed, the state of the optical system is recognized by the lens information-recognition means 67 (step S10). A change in the state of the optical system is found when the state of the interchangeable camera lens 14 is recognized by the camera 12 upon the activation of the photographic apparatus 10 (when the power supply is turned on) and, in addition, when the interchangeable camera lens 14 is mounted or replaced and when the state of the optical system of the photographic apparatus 10 (the state of the optical system of the interchangeable camera lens 14) is changed, for example, when an optical system such as a comparator lens or an extender is added or replaced or when the zoom setting is changed.

Next, the state of the optical system after the change is input from the lens information-recognition means 67 to the lens-side microcomputer 22, and the lens-side microcomputer 22 generates blur correction process-information based on the configuration of the optical system (step S12). For example, the blur correction process-information is information on the maximum correcting angle and zoom (focal length). The maximum correcting angle is calculated based on the focal length of the interchangeable camera lens 14 and a maximum value of displacement of the blur correction lens 64.

Then, the blur correction process-information generated at step S12 is transmitted to the camera-side microcomputer 16 (step S14).

Figure 3:
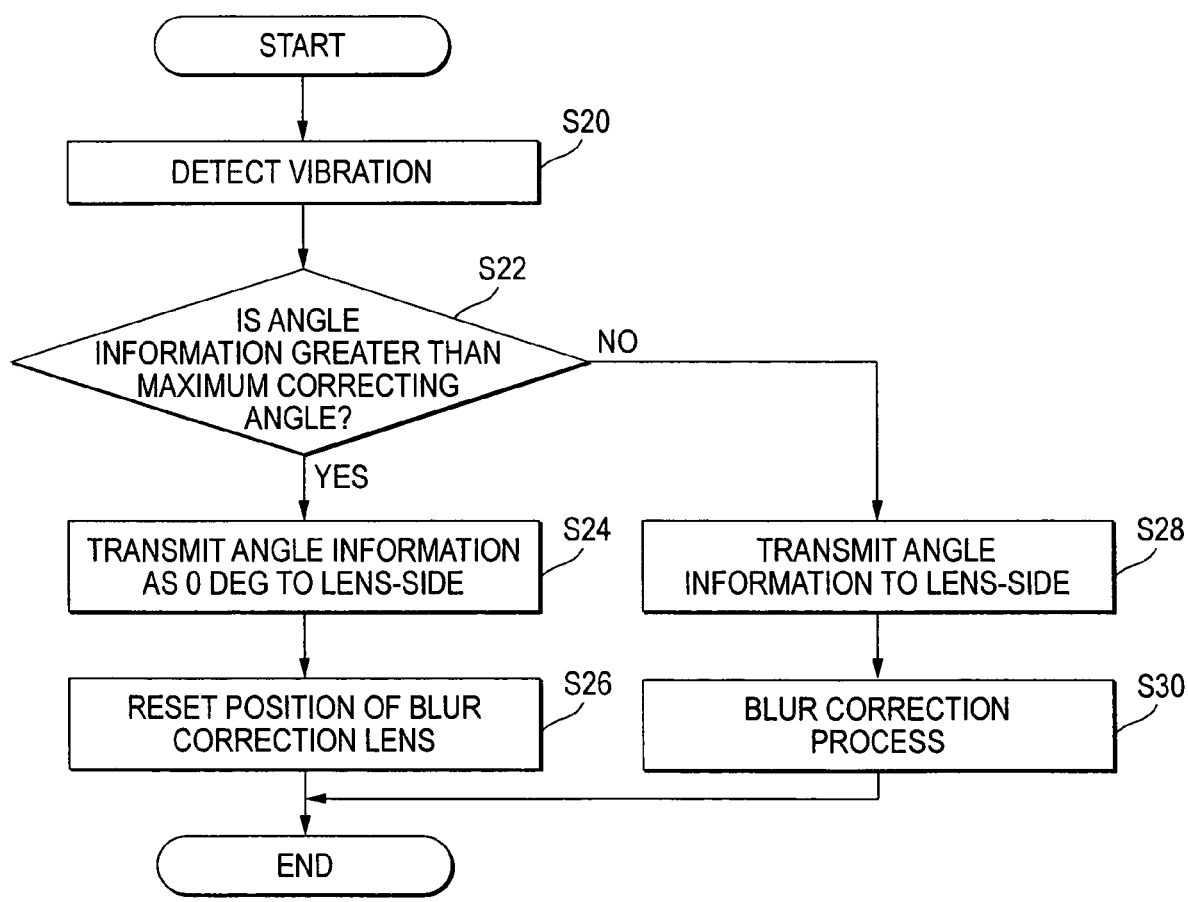
FIG. 3 is an exemplary flow chart showing a method of correcting a blur on an image.

FIG. 3 is a flow chart showing the blur correcting method of the present embodiment. First, when a vibration is applied to the photographic apparatus 10 and detected by the angular velocity signal-outputting unit 18 (step S20), the camera-side microcomputer 16 determines whether the angle of the detected vibration is greater than the maximum correcting angle of the interchangeable camera lens 14 (step S22).

When it is determined at step S22 that the angle of the vibration is greater than the maximum correcting angle, the angle of the vibration is transmitted as 0° from the camera-side microcomputer 16 to the lens-side microcomputer 22 (step S24) to reset the position of the blur correction lens 64 (step S26). That is, no blur correction is performed. On the contrary, when it is determined at step S22 that the angle of the vibration is equal to or smaller than the maximum correcting angle, the angle of the vibration is transmitted as it is from the camera-side microcomputer 16 to the lens-side microcomputer 22 (step S28) to drive the blur correction lens 64. Thus, a blur correcting process is performed (step S30).

At step S22, a determination is made on whether the angle of the vibration is greater than the maximum correcting angle or not as a criterion for the discrimination of the vibration. A range of angles may alternatively be used as the criterion such that the process proceeds to step S24 when the angle of the vibration is greater than the maximum correcting angle by a value or more and such that the process proceeds to step S28 when the angle is smaller than the maximum correcting angle by the value or more.

In the present embodiment, the maximum correcting angle of the interchangeable camera lens 14 is transmitted from the lens-side microcomputer 22 to the camera-side microcomputer 16 to enable a process of discriminating a vibration to be corrected from a vibration resulting from an intentional operation of the photographer (e.g., tilting or panning), which allows an optimum blur correcting process to be performed.

While the maximum correcting angle is calculated by the lens-side microcomputer 22 in the present embodiment, the maximum correcting angle may alternatively be calculated by the camera-side microcomputer 16 by transmitting the focal length of the interchangeable camera lens 14 and the maximum value of displacement of the blur correction lens 64 to the camera-side microcomputer 16.

In the photographic apparatus 10 shown in FIG. 1, the lens-side microcomputer 22 for controlling the lens system is included in the interchangeable camera lens 14. However, the lens-side microcomputer 22 is not limited to such a disposition, and the invention may be applied to any photographic apparatus as long as it includes a plurality of microcomputers for controlling a camera and a lens.

Figure 4:
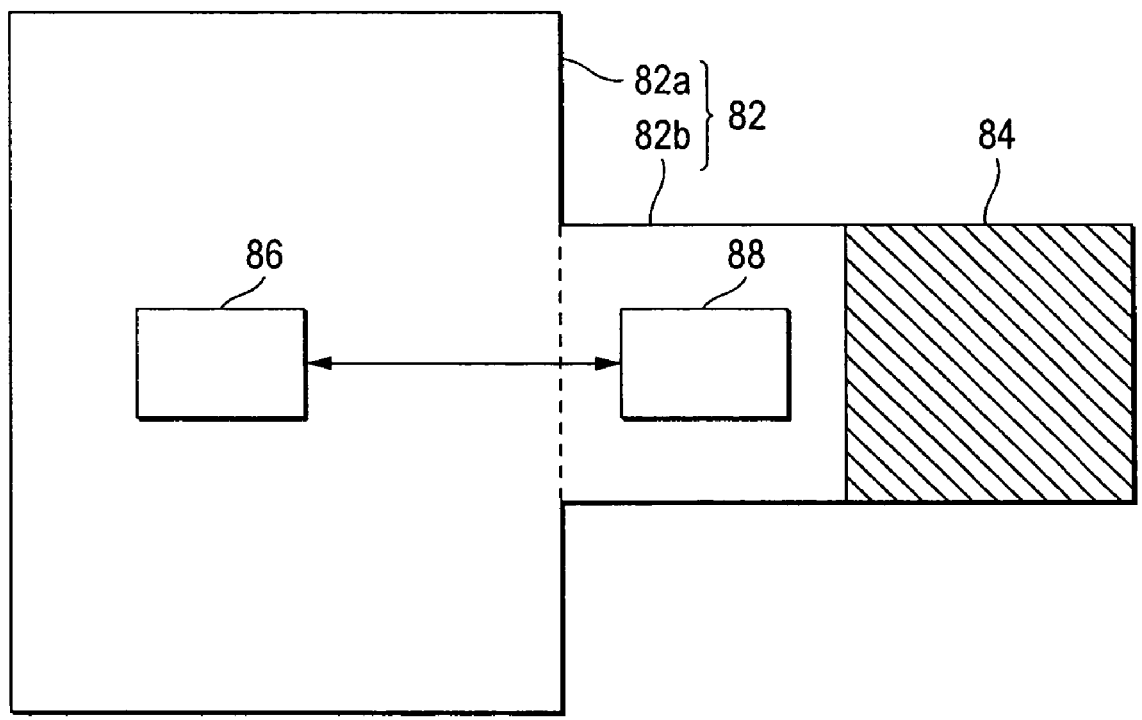
FIG. 4 is a block diagram of another illustrative, non-limiting embodiment of a photographic apparatus.

FIG. 4 is a block diagram of another exemplary embodiment of a photographic apparatus. A photographic apparatus 80 shown in FIG. 4 includes a camera 82 and an interchangeable camera lens 84. The camera 82 includes a camera unit 82a and a lens unit 82b having a camera-side microcomputer 86 for controlling the camera unit 82a and a lens-side microcomputer 88 for controlling the lens unit 82b and the interchangeable camera lens 84, respectively.

In the embodiment shown in FIG. 4, the lens-side microcomputer 88 recognizes the state of the interchangeable camera lens 84 and generates blur correction process information, and the blur correction process-information is transmitted from the lens-side microcomputer 88 to the camera-side microcomputer 86 to allow an optimum blur correcting process to be performed as in the above-described embodiment.

It will be apparent to those skilled in the art that various modifications and variations can be made to the described preferred embodiments of the invention without departing from the spirit or scope of the invention. Thus, it is intended that the invention cover all modifications and variations of this invention consistent with the scope of the appended claims and their equivalents.

The entire disclosure of each and every foreign patent application from which the benefit of foreign priority has been claimed in the present application is incorporated herein by reference, as if fully set forth herein.

What is claimed is:

1. A photographic apparatus comprising:
   a camera;
   an interchangeable camera lens whose optical system is partially or entirely interchangeable; and
   a lens control unit configured to control the interchangeable camera lens, wherein
   the camera comprises: a blur signal-outputting unit configured to output a blur signal associated with a vibration applied to the interchangeable camera lens; and a camera control unit configured to control the camera,
   the interchangeable camera lens comprises: a blur correcting unit configured to displace an image; and an image displacing unit configured to control the blur correcting unit based on the blur signal output from the blur signal-outputting unit so that the blur correcting unit displaces the image so as to cancel a blur of the image, the blur resulting from the vibration applied to the interchangeable camera lens, the canceling of the blur including correcting for the vibration along more than one directional axis, and an amount of the displacement of the image is based on blur signal output from the blur signal-outputting unit,
   the lens control unit is configured to obtain information on blur correction at the interchangeable camera lens according to a state of the interchangeable camera lens and is configured to transmit the information on blur correction to the camera control unit, wherein
   the information on blur correction includes information on a maximum correction angle at the time of blur correction at the interchangeable camera lens, and the camera control unit is further configured to control the lens control unit such that no blur correction is performed when an angle of the vibration applied to the interchangeable camera lens is greater than the maximum correcting angle of the interchangeable camera lens.

2. The photographic apparatus according to claim 1, wherein the lens control unit is configured to obtain the information on blur correction and is configured to transmit the information to the camera control unit at least one of when a power supply of the photographic apparatus is turned on, when the interchangeable camera lens is mounted on the camera and when the state of the interchangeable camera lens is changed.

3. The photographic apparatus of claim 1, wherein the blur signal-outputting unit outputs a blur signal, associated with a vibration applied to the interchangeable camera lens, to the lens control unit where the lens control unit calculates information used by the blur correcting unit to control the image displacing unit.

4. An interchangeable camera lens mounted on a photographic apparatus including the interchangeable camera lens whose optical system is partially or entirely interchangeable, and a camera, the camera including a blur signal-outputting unit configured to output a blur signal associated with a vibration applied to the interchangeable camera lens, and a camera control unit configured to control the camera, the interchangeable camera lens comprising:
   a blur correcting unit configured to displace an image;
   an image displacing unit configured to control the blur correcting unit based on the blur signal output from the blur signal-outputting unit so that the blur correcting unit displaces the image so as to cancel a blur of the image, the blur resulting from the vibration applied to the interchangeable camera lens, the canceling of the blur including correcting for the vibration along more than one directional axis, wherein an amount of the displacement of the image is based on blur signal output from the blur signal-outputting unit; and
   a lens control unit configured to control the interchangeable camera lens, the lens control unit configured to obtain information on blur correction at the interchangeable camera lens according to a state of the interchangeable camera lens and is configured to transmit the information on blur correction to the camera control unit.

5. The apparatus of claim 4, wherein the blur signal-outputting unit outputs a blur signal, associated with a vibration applied to the interchangeable camera lens, to the lens control unit where the lens control unit calculates information used by the blur correcting unit to control the image displacing unit.

* * * * *